(12) United States Patent
Simgi

(10) Patent No.: US 10,026,008 B2
(45) Date of Patent: Jul. 17, 2018

(54) INSPECTION AND CLASSIFICATION SYSTEM

(71) Applicant: Ronen Simgi, Moshav Shilat (IL)

(72) Inventor: Ronen Simgi, Moshav Shilat (IL)

( * ) Notice: Subject to any disclaimer, the term of this patent is extended or adjusted under 35 U.S.C. 154(b) by 132 days.

(21) Appl. No.: 15/348,566

(22) Filed: Nov. 10, 2016

(65) Prior Publication Data

US 2017/0132489 A1  May 11, 2017

(30) Foreign Application Priority Data

Nov. 11, 2015 (IL) .......................................... 242550

(51) Int. Cl.

| | | |
|---|---|---|
| *G06K 9/00* | (2006.01) | |
| *G06K 9/62* | (2006.01) | |
| *G06K 7/14* | (2006.01) | |
| *G06K 9/46* | (2006.01) | |
| *G06N 99/00* | (2010.01) | |
| *G06Q 10/08* | (2012.01) | |
| *G06Q 10/10* | (2012.01) | |
| *G06Q 50/18* | (2012.01) | |

(Continued)

(52) U.S. Cl.
CPC ......... *G06K 9/6201* (2013.01); *G06K 7/1413* (2013.01); *G06K 9/4671* (2013.01); *G06N 99/005* (2013.01); *G06Q 10/08* (2013.01); *G06Q 10/083* (2013.01); *G06Q 10/10* (2013.01); *G06Q 50/18* (2013.01); *G06Q 50/32* (2013.01); *G06K 2209/01* (2013.01)

(58) Field of Classification Search
USPC ........ 382/100–103, 106–107, 112, 140, 143, 382/154–155, 162, 168, 173, 181–182, 382/199, 209, 219, 24, 232, 254, 274, 382/276, 286–291, 305, 312, 321; 209/586; 705/28, 401
See application file for complete search history.

(56) References Cited

U.S. PATENT DOCUMENTS 6,360,001 B1 *  3/2002  Berger ................. G06K 9/2054
                                                  382/101
7,451,119 B2 *  11/2008 Elliot ....................... B07C 3/00
                                                  705/401

(Continued)

*Primary Examiner* — Seyed Azarian
(74) *Attorney, Agent, or Firm* — William Dippert; Laurence Greenberg; Werner Stemer

(57) ABSTRACT

Inspection and classification system have a customs data repository for automatic customs inspection of parcels comprising a data acquisition module configured to acquire information about parcels by input devices, wherein the information indicates customs classification criterias, the acquisition module further configured to communicate the information to the customs data repository; wherein the data repository stores the following data: information about parcels; parameters; attributes and big-data; a processor coupled with memory configured to map the information according with the parameters and attributes, wherein the mapped information of the parcel is a cluster; the processor is further configured for predicting customs classification of the parcel based upon comparison between parameters/attributes of the cluster and parameters/attributes of clusters stored in the big-data, wherein clusters stored in the big-data are were previously inspected, and wherein the cluster assumes a customs classification of a comparable cluster stored in the big-data.

19 Claims, 3 Drawing Sheets

(51) Int. Cl.
*G06Q 50/32* (2012.01)
*G06F 17/00* (2006.01)

(56) References Cited

U.S. PATENT DOCUMENTS

| | | | |
|---|---|---|---|
| 2001/0034608 A1 | 10/2001 | Gendreau | |
| 2002/0011432 A1* | 1/2002 | Tanimoto | B07C 1/00 |
| | | | 209/586 |
| 2008/0154751 A1* | 6/2008 | Miles | G06Q 10/06 |
| | | | 705/28 |
| 2008/0192978 A1* | 8/2008 | Rundle | B07C 1/00 |
| | | | 382/101 |
| 2013/0223673 A1* | 8/2013 | Davis | G06K 9/78 |
| | | | 382/100 |
| 2014/0351073 A1 | 11/2014 | Murphy et al. | |

* cited by examiner

INSPECTION AND CLASSIFICATION SYSTEM

TECHNICAL FIELD

The present disclosure relates to information technology system in general, and to customs inspection and or processing, in particular.

BACKGROUND

The Internet penetration in the last two decades has led to a gradual growth of online retail. In 2013 the UK alone had more than 500 million internet orders, which translates to £3 billion. In 2014 the total online retail market grew by 20% and it's estimated to grow by 17% in 2015. Clearly online retail directly impact parcel shipment industry such as postal services and courier services such as Federal Express (FedEx), United Parcel Services (UPS), or the like.

Most parcel delivery services, thousands of parcels are shipped every day from hundreds or thousands of departure locations to hubs, and then redistributed and delivered to thousands locations. In many cases, parcels have committed delivery times. Most courier companies utilize automated equipment for distribution and information related to the processing and delivering parcels within shipment deadlines.

Indeed automation improved the domestic distribution process, yet the international distribution process is falling behind due the customs bottleneck. Most parcels are subject to customs regulations, which defer from country to country, meaning that each parcel must be evaluated to determine whether customs inspection is necessary. If inspection is necessary, the parcel must be diverted to a customs hub for inspection and then routed back to the distribution process. Typically, foreign origin parcels must be segregated from the domestic parcels prior to inspection. This typically requires that the parcel delivery company maintain a separate area for processing foreign origin parcels separate from its area for processing domestic parcels.

Since customs inspection procedures are mainly manual operations multiplied by hundred s of thousand of foreign parcels a day becomes a nuisance. These manual selection followed by manual inspection, re-routing, and reporting can delay shipping deadlines, increase shipment cost, contribute human errors and entirely dependent on labor subjected to union dictation.

SUMMARY OF THE INVENTION

One primary aspect of the present disclosure is an inspection and classification system having a customs data repository for automatic customs inspection of parcels, the system comprising: a data acquisition module configured to acquire information about a parcel by a plurality of input devices, wherein the information about the parcel is indicative of criteria's for customs classification of the parcel, wherein the data acquisition module is further configured to communicate the information about the parcel to the customs data repository; wherein the customs data repository is configured to store data selected from the group comprising of: the information about a plurality of parcels; parameters tables; attributes tables; and big-data; a processor coupled with memory, wherein the processor is configured to map the information about a parcel in accordance with the parameters tables and attributes tables, wherein a representation of the mapped information about the parcel is a cluster; and wherein the processor is further configured for predicting a customs classification of the parcel based on a comparison between the parameters and attributes of the cluster and parameters and attributes of clusters stored in the big-data, wherein the clusters stored in the big-data are clusters of previously inspected parcels, and wherein the cluster assumes a customs classification of a comparable cluster stored in the big-data.

In some exemplary embodiments the data acquisition module further comprising: selective control of each input device of the plurality of input devices; and means for receiving acquired information from the plurality of input devices.

In some exemplary embodiments an input device of the plurality of input devices is a barcode reader, configured to acquire digital representation of information about the parcel.

In some exemplary embodiments an input device of the plurality of input devices is a scale sensor, configured to measure weight of the parcel.

In some exemplary embodiments an input device of the plurality of input devices is a geometry sensor, configured to acquire a three dimensional dimensions of the parcel.

In some exemplary embodiments an input device of the plurality of input devices is an optical character recognition (OCR) scanner configured to acquire information selected from the group comprising of: handwritten characters; typed characters; symbols; icons; stamps and postage stamps from the parcel.

In some exemplary embodiments a plurality of input devices acquire information about a plurality of parcels simultaneously.

In some exemplary embodiments the plurality of input devices acquires information about the parcel while the parcel is conveyed by a conveyor.

In some exemplary embodiments the processor coupled with memory further comprising a customs classification index, wherein the customs classification index is utilized for indicating the customs classification of a comparable cluster stored in the big-data, wherein each cluster stored in the big-data is characterized by a combination of its parameters and attributes.

In some exemplary embodiments the processor coupled with memory is further configured to utilize machine learning algorithms for manipulating the big-data.

Another primary aspect of the present disclosure is a data acquisition system for automatic customs inspection of parcels comprising: a data acquisition module configured to acquire information about a plurality of parcels by a plurality of input devices, wherein the information of each parcel of the plurality of parcels is indicative of criteria's for customs classification of the each parcel, wherein the data acquisition module is further configured to selectively control each input device of the plurality of input devices, wherein the data acquisition module is further configured to communicate the information about the plurality of parcels, wherein the plurality of input devices are configured to acquire information in parallel and independent of each other, and wherein the plurality of input devices are configured to transmit acquired information to the data acquisition module.

In some exemplary embodiments an input device of the plurality of input devices is a barcode reader, configured to acquire digital representation of information about a parcel of the plurality of parcels.

In some exemplary embodiments an input device of the plurality of input devices is a scale sensor, configured to measure weight of a parcel of the plurality of parcels.

In some exemplary embodiments an input device of the plurality of input devices is a geometry sensor, configured to acquire a three dimensional dimensions of a parcel of the plurality of parcels.

In some exemplary embodiments an input device of the plurality of input devices is an optical character recognition (OCR) scanner configured to acquire information selected from the group comprising of: handwritten characters; typed characters; symbols; icons; stamps and postage stamps from a parcel of the plurality of parcels.

In some exemplary embodiments a plurality of input devices acquire information about a plurality of parcels simultaneously.

In some exemplary embodiments the plurality of input devices acquires information about a parcel of the plurality of parcels while the parcel is conveyed by a conveyor.

Yet another primary aspect of the present disclosure is a method for automatic inspection and classification of parcels through customs, wherein the parcels are selected from the group comprising of: boxes; packages; and large envelopes, the method comprising: obtaining information about a parcel under inspection; forming a cluster for the parcel under inspection, wherein the cluster is a record comprising a data representation of the information about the parcel under inspection, wherein the data representation comprises a plurality of entries, and wherein the forming a cluster further comprising: obtaining a list comprising parameters and attributes values, wherein the parameters and attributes values indicates classification criteria's; tagging at least one entry of the plurality of entries with a matching parameter value; and determining, by a processor, a matching attribute value for each entry of the cluster that is tagged with a matching parameter; predicting a customs classification of the cluster, wherein the predicting further comprising indicating the cluster as an inspected cluster; outputting an outcome of the predicting of the cluster, wherein the outcome represents a customs classification of the parcel under inspection; validating an outcome, wherein the validating an outcome comprises a maintenance procedure of comparing a the predicting outcome with outcome of manually performed inspection, wherein the maintenance procedure occurs periodically; and wherein the validating further comprises updating customs classification of clusters indicated as inspected cluster and having comparable parameters and attributes.

In some exemplary embodiments the obtaining is utilizing a data acquisition module for acquiring the information about a parcel under inspection from a plurality of input devices.

In some exemplary embodiments the tagging is utilizing a successive approximation calculation to determine a substantially nearest matching parameter for an entry.

In some exemplary embodiments the determining is utilizing successive approximation calculation to determine a substantially nearest matching attribute for an entry tagged with a parameter.

In some exemplary embodiments all inspected clusters are retained in a big-data repository.

In some exemplary embodiments the predicting is utilizing a machine learning algorithm to determine customs calcification of parcels based on analytical study of the inspected clusters retained in a big-data repository.

In some exemplary embodiments the predicting is utilizing a data mining algorithm to determine customs calcification of parcels by drilling down to parameters and attributes of the inspected clusters retained in a big-data repository.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF THE INVENTION

Figure 1:
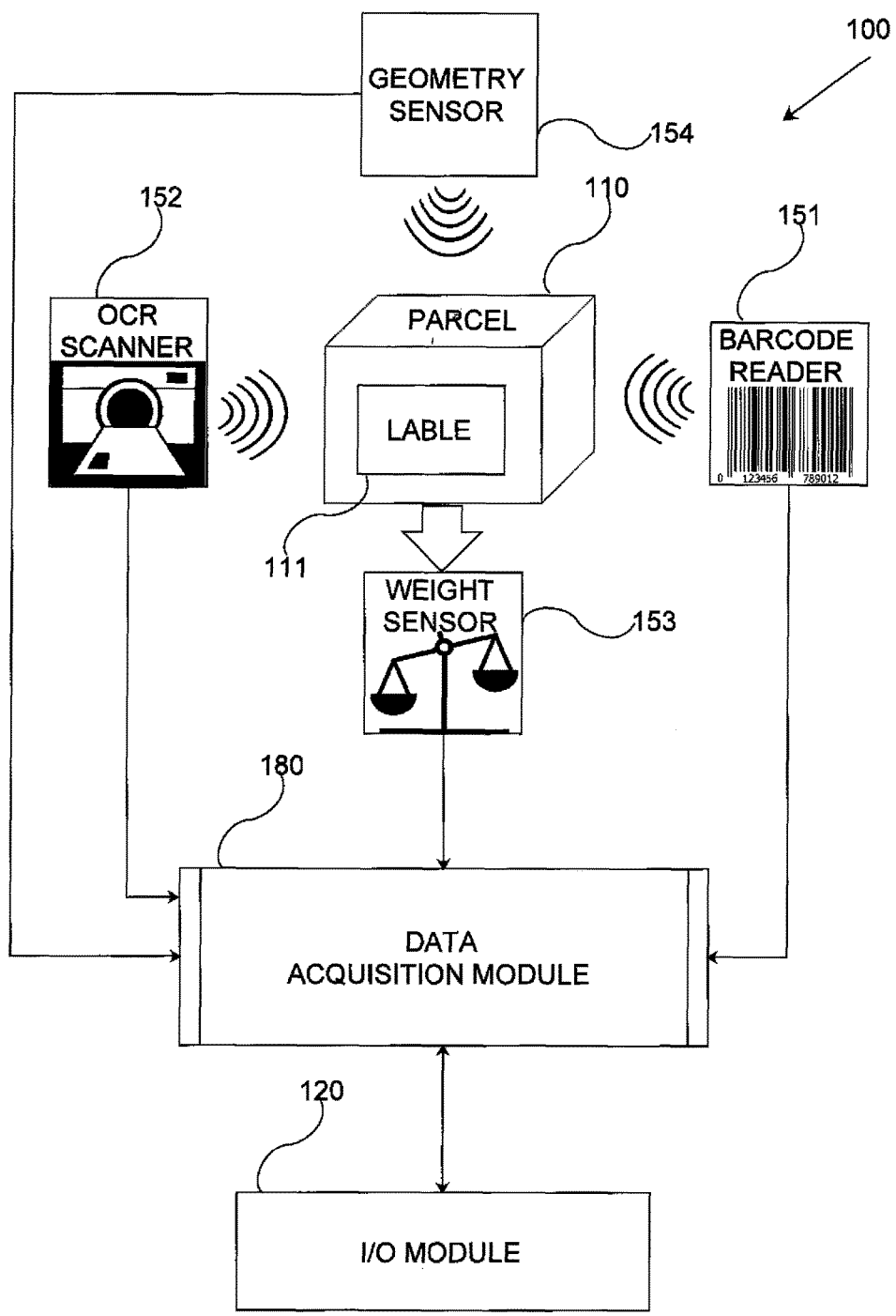
FIG. 1 shows a block diagram of a data acquisition system, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

In general, customs procedure for parcels may be conducted by customs agents or customs brokers that represent postal or couriers companies. The procedure typically includes documents processing, delivery details, classification, sample testing, parcel detaining (if delay is required), charging, release, monitoring and distribution. Typically foreign origin parcels are first routed to security check and than transported to a regional postal sorting facility, where postal workers manually collect information of each parcel and submit it to the customs officer.

In some cases the information may comprise an address of a recipient, an address of a sender, the weight of the goods packed in a parcel, the cost of goods, a combination thereof, or the like. In some commercially available solutions the information associated to the parcel may be; displayed on a label glued to the parcel, printed on accompanying documents that are attached to the parcel; handwritten on at least one side of the parcel; a combination thereof, or the like. Additionally or alternatively a barcode sticker can be affixed to the parcel, the barcode may be a digital representation of the information associated to the parcel.

Based on available information, of each parcel, the customs officer may determine if customs duty applies, and if it does, the amount due, based on criteria's varying from country to country may be charged. Following the customs duties determination, the parcel is labeled, a notification is sent to the addressee and the parcel may be transported to the nearest postal office of the addressee. The addressee may release the parcel or the packaged once paying the customs duties; if customs duties do not apply the parcel may be routed directly for delivery. In some cases parcels are detained for further examination together with the addressee due to lack of information or reasons related to the customs regulations.

One problem dealt with by the disclosed subject matter is the cumbersome and slow customs import inspection for parcels. In some regions, hundreds of thousands of imported parcels arrive to regional distribution centers a day and the quantity is on a steady rise due to the growing activity of internet retail. Since customs inspection is labor intensive and since parcels traffic volume is drastically growing, then the amount of workers must follow suit. More imported parcels and packages, and more employees equal to higher operation cost and growing chances of human error.

Another problem dealt with by the disclosed subject matter is a lack of skilled workers to carry out customs inspection of the steady growing number of imported parcels. In some exemplary embodiments, these may result in a situation of non-compliance with delivery deadlines as well as an increase in examination errors. Additionally or alternatively due to deadline and manpower concerns customs officers may be forced to either cease inspection or subsequently minimize the parcels inspection ratio.

Yet another problem dealt with by the disclosed subject matter is that many foreign originated parcels arrive with incomplete information required for customs inspection. In some exemplary embodiments, the information may be lacking the address of a sender, the country of origin, the weight of the goods, the cost of goods, the barcode sticker, a combination thereof, or the like. In some cases, the information associated to the parcel may be printed or handwritten on a label glued to one side of the parcel, thereby forcing the customs personnel to manually log the information if accompanying documents, such as bill of lading, were not attached to the parcel.

Yet another problem dealt with by the disclosed subject matter is incomplete and inconsistence data logging to a customs data repository. These flaws are resulting, in some exemplary embodiments, from lack of skilled workers, incomplete information, time constraints, a combination thereof, or the like. In some exemplary embodiments, such flaws may result in duties collection deficiency (estimated at many millions US dollars a year); a severe impact on customs organization, enforcing customs policy, customs ability to illuminate illegal substance trafficking, a combination thereof, or the like.

One technical solution is an automated inspection and classification system (ICS). In some exemplary embodiments, the automated ICS may be configured to automatically obtain information associated with the parcel by utilizing sensors that are controlled by a data acquisition module. Additionally or alternatively the data acquisition module may be configured to transfer the information to a customs repository. The information may comprise the address of an addressee; the address of a sender; the weight of the goods packed in a parcel; the cost of goods; port of origin; arrival port; parcel rooting path from original sender; sender line of business; combination thereof, or the like.

Another technical solution is utilizing the ICS to automatically determine the customs calcification of a parcel based on the information obtained by the data acquisition module and predefined set of parameters. In some exemplary embodiments, the set of parameters may be defined in accordance to the customs regulations of each country. Additionally or alternatively the ICS may be utilizing past class determination data stored in the customs repository in order to determine current classification of parcel in hand.

One technical effect of utilizing the disclosed subject matter is: the significant reduction of manpower required to perform the operation of customs inspection. Consequently reducing the human inspection errors and the dependency on skilled workers.

Another technical effect of utilizing the disclosed subject matter is, improving customs inspection potential of the classification process, thus better coping with the steady growing number of imported parcels and delivery deadlines.

Yet another technical effect of utilizing the disclosed subject matter is, preventing inspection halts and improving inspection ratio due to lack of manpower and excessive work load, thus improving customs organization efficiency to enforce customs regulations.

Yet another technical effect of utilizing the disclosed subject matter is preventing incomplete and inconsistence data logging to a customs data repository. Thus, improving duties collection and increasing state revenue. In some exemplary embodiments, utilizing the disclosed subject matter may help law informant authorities to illuminate illegal substance trafficking.

Referring now to FIG. 1 showing a block diagram of a data acquisition system 100, in accordance with some exemplary embodiments of the disclosed subject matter. System 100 may be a computerized system adapted to perform several steps of the method depicted in FIG. 3

In some exemplary embodiments, System 100 may comprise a data acquisition module (DAM) 180. DAM 180 may be an electronic circuit, an Integrated Circuit (IC), implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). DAM 180 may be utilized to obtain and process information required by System 100 or any of it subcomponents.

In some exemplary embodiments, DAM 180 may comprise at least one interface (not shown) for controlling a plurality of sensors and acquiring information from the plurality of sensors. An interface may comprise analog to digital converters (ADC), for converting analog signals arriving from a sensor. In some exemplary embodiments, the at least one interface may be able to communicate with the plurality of sensors over universal bus interface (USB); serial communication port, such as RS-232, RS-485, a combination thereof, or the like. Additionally or alternatively communication between the plurality of sensors and the at least one interface may be over Ethernet network; wireless media, such as Bluetooth, Wi-Fi; a combination thereof, or the like. The at least one interface may be able to utilize transmission control protocol/internet protocol (TCP/IP) protocols or the like over the physical medias described above.

In some exemplary embodiments of the disclosed subject matter, DAM 180 may control the plurality of sensors as well as acquiring information from the plurality of sensors. Additionally or alternatively DAM 180 may be configured to communicate digital information acquired from the plurality of sensors with an Inspection and Classification System (ICS) 200 depicted in FIG. 2.

In some exemplary embodiments, system 100 may comprise a plurality of sensors, such as, a barcode reader sensor 151, Optical Character Recognition (OCR) sensor 152, weight sensor 153, geometry sensor 154, a combination thereof, or the like. The plurality of sensors may be configured to detect information associated with parcel 110.

In some exemplary embodiments of the disclosed subject matter, a parcel 110 may be inspected. It should be noted that the term "parcel" in the present discloser refers to: a box, a package, a large envelope, a wrapped bundle package, a parcel, or the like, that is usually delivered to a recipient via a mail service. It's also should be noted that the present disclosed discloser refers to a foreign originated parcels, in other words, the sender of the parcel, such as parcel 110, and the recipient may be situated in different countries. In some exemplary embodiments, parcel 110 may contain goods, such as salable merchandise, liable for imposts imposed by the sovereign law of a country on imports. An imposts tariff, i.e. customs dues, may vary from one importing country to another according to the following criteria's: estimated value of goods; the quantity of goods items; weight of goods; size of goods; type of goods; country of origin; a combination thereof, or the like.

In some exemplary embodiments of the disclosed subject matter, at least one label, such as Label 111, may be affixed to a parcel, such as parcel 110. Label 111 may contain information associated with the parcel, such as recipient address, sender address, goods weight, goods quantity, cost of goods, courier information, insurance information, description of goods, information relevant to the shipment of goods, a combination thereof, or the like. In some exemplary embodiments, label 111 may be a barcode sticker; an address sticker; bill of lading; a side of parcel skin displaying information handwritten on it; a combination thereof, or the like.

In some exemplary embodiments, a barcode reader sensor 151 may be used. Barcode reader sensor 151 may be an electronic device that read and output printed barcodes to DAM-180. Such barcode reader sensor may comprise a light source, a lens and a light sensor translating optical impulses into electrical ones, a combination thereof, or the like. Additionally or alternatively the barcode reader may also comprise a decoding circuitry for analyzing the barcode's image data provided by the sensor and sending the barcode's information to DAM-180. In some exemplary embodiments, barcode reader sensor 151 may be used to obtain information associated with the parcel and communicate it to DAM-180.

In some exemplary embodiments, an OCR sensor 152 may be used. An OCR sensor 152 may be utilized as an images conversion of typed, handwritten or printed text into machine-encoded text. OCR 152 may be used as a form of data input from: documents accompanying a foreign origin parcel; typed handwritten or printed text on labels, such as Label 111, affixed to a parcel; images of stamps; handwritten or printed text on a side of a parcel; a combination thereof, or the like. In some exemplary embodiments, OCR sensor 152 may be a two dimensional document scanner equipped with OCR software and configured for digitizing printed and handwritten characters into digital text. Consequently allowing: compact storing document in a customs repository, searching content in the document, displaying the image characters as text, enabling machine processes, editing a document by means of word processing program, a combination thereof, or the like. In some exemplary embodiments, OCR sensor 152 may be configured to recognize printed and handwritten characters of multiple languages and covert them into digital text. Additionally or alternatively OCR sensor 152 may configured to translate the digital text of a language of the multiple language into the official language of the importing country.

In some exemplary embodiments, a weight sensor 153 may be used. Weight sensor 153 may be a weighing scale device configured to measure weight or calculate mass by balancing the force due to gravity against the force on a spring, whereas a balance or pair of scales using a balance beam compares masses by balancing the weight due to the mass of an object against the weight of a known mass or masses. Weight sensor 153 may be calibrated to read in units of force such as pounds, ounces, or in units of mass such as kilograms, grams, a combination thereof, or the like. In some exemplary embodiments, a weight sensor 153 may be used to measure a weight of a single parcel at a given time.

In some exemplary embodiments, a geometry sensor 154 may be used. Geometry sensor 154 may be used to obtain the dimensions of a parcel. Geometry sensor 154 may be in some embodiments, a three Dimensional (3D) shape measurement device; a range scanning device; a 3D scanning device; a digital fringe projection device incorporating fringe analysis; a dimensional measurement device based on optical metrology; a combination thereof, or the like. Additionally or alternatively a two dimensional digital camera (not shown) may be used. The digital camera may be used to document the shape and the condition of the parcel upon arrival to the inspection area.

As an example, foreign originated parcels arrive the customs inspection area on a conveyor, may be sensed by a plurality of sensors, such as barcode reader sensor 151, OCR sensor 152, weight sensor 153 and geometry sensor 154. The plurality of sensors may be situated along the conveyor crossing the inspection area and once a parcel traverses next a sensor, the parcel information may be obtained by that sensor and communicated to an I/O Module, such as I/O Module 120. After the parcel passes the plurality of sensors, a classification of the parcel may be determined by a processor, such as Processor 210 shown in FIG. 2. Upon the classification determination, the parcel may be routed to delivery with no charge, delivery with charge, manual inspection, detention, or the like.

I/O Module 120 shall be discussed in details later on.

Figure 2:
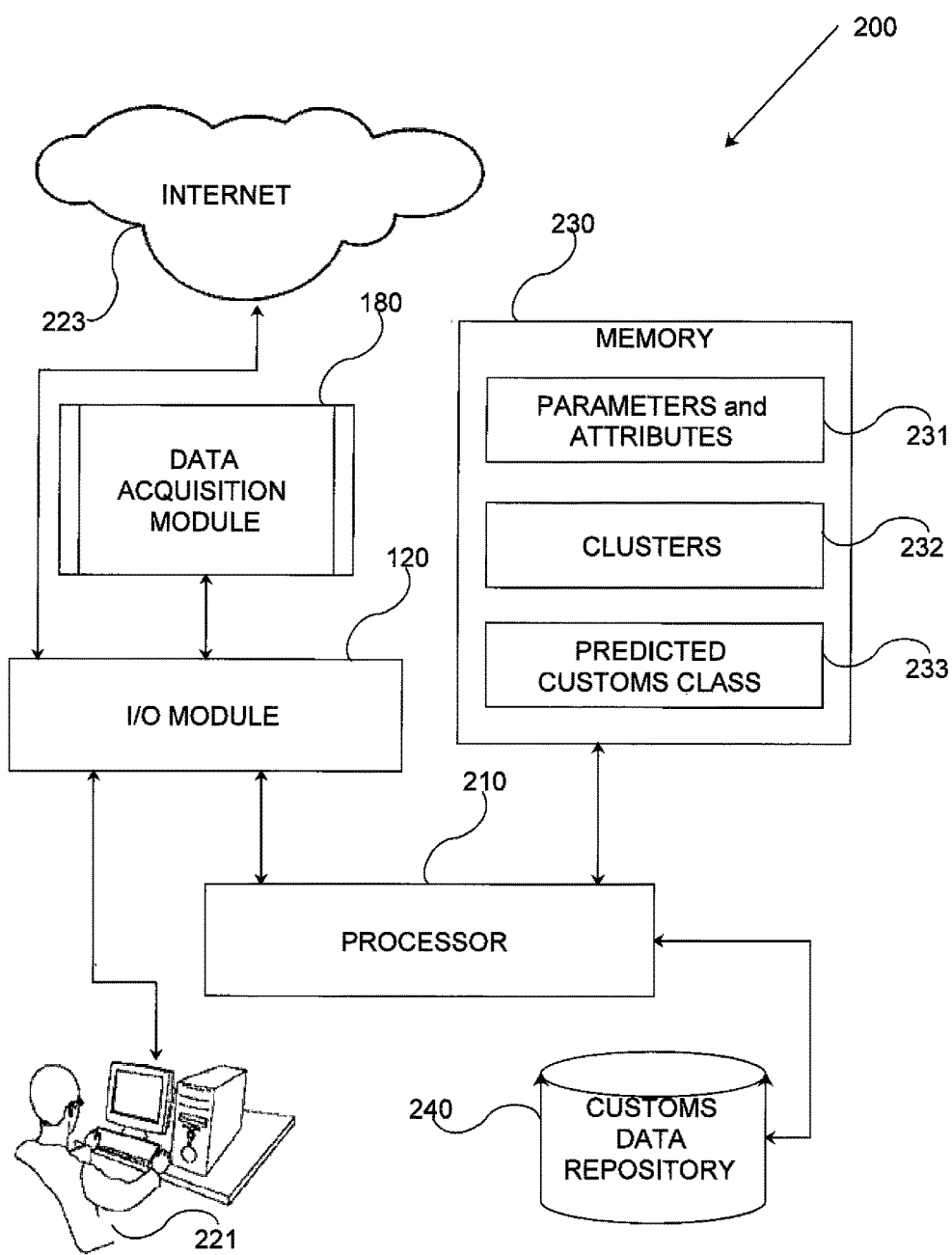
FIG. 2 shows a block diagram of an inspection and classification system, in accordance with some exemplary embodiments of the disclosed subject matter.

Referring now to FIG. 2 showing a block diagram block diagram of an inspection and classification system (ICS) 200, in accordance with some exemplary embodiments of the disclosed subject matter. ICS 200 may be a computerized system adapted to perform the method depicted in FIG. 3

In some exemplary embodiments, ICS 200 may comprise a Processor 210. Processor 210 may be a Central Processing Unit (CPU), a microprocessor, an electronic circuit, an Integrated Circuit (IC) or the like. Additionally or alternatively, ICS 200 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 210 may be utilized to perform computations required by ICS 200 or any of it subcomponents.

In some exemplary embodiments of the disclosed subject matter, ICS 200 may comprise an Input/Output (I/O) Module 120. ICS 200 may utilize I/O Module 120 as an interface to transmit and/or receive information and instructions between ICS 200 and external I/O devices, such as a Workstation 221, DAM 180, the Internet 223, or the like. In some exemplary embodiments, I/O Module 120 may be used to provide an interface to a user operating Workstation 221 of the system, such as by providing output, visualized results, reports, or the like. Workstation 221 may be used by a user to input information and instructions to ICS 200. However, it should be appreciated that ICS 200 can operate without human intervention. In some exemplary embodiments, an internet connection may be used to connect ICS 200 to the Internet 223. The Internet 223 may facilitate the process of communicating to a cloud base customs data repository comprising information associated with imposts regulation of the sovereign law of a country on imports.

In some exemplary embodiments, ICS 200 may comprise a Memory Unit 230. Memory Unit 230 may be persistent or volatile. For example, Memory Unit 230 can be a Flash disk, a Random Access Memory (RAM), a memory chip, an optical storage device; a magnetic storage device; a semiconductor storage device, a combination thereof, or the like. In some exemplary embodiments, Memory Unit 230 may retain program code to activate Processor 210 to perform acts associated with steps shown in FIG. 3. Memory Unit 230 may also be used to retain cash entries, such as Parameters & Attributes (P&R) 231, Cluster 232, Customs Classification Index (CCI) 233, or the like.

In some exemplary embodiments, P&R 231 may be a table of parameters each having a set of attributes. Parameters & Attributes 231 may be configured to comply with customs import regulation for each country. P&R 231 may be used as a guideline for determining a parcel classification and may be updated from time to time.

P&R 231 may be visualized as a table, wherein the table's rows represents parameters and the columns represents attributes, hence each parameter may be represented by a set of attributes. In some exemplary embodiments the parameters may be defined as estimated value of goods; quantity of goods items; weight of goods; size of goods; type of goods; country of origin, a combination thereof, or the like. Given the above the set attributes are a range of predefined values for each parameter. For example, a parameter, such as "quantity of goods items" may have the following attributes: quantity of one, quantity of two, quantity of four, quantity of eight, or the like. Therefore, a single cell of the table represents a predefined value, such as customs dues amount, of a specific parameter and a specific attribute.

In some exemplary embodiments, Cluster 232 may be a representation of a parcel under inspection. The representation comprises information about the parcel that was tagged by matching parameters & attributes according to P&R 231 table. That is to say, that in some exemplary embodiments the information associated with the parcel, such as addresses, weight of goods, cost of goods, quantity of goods, or the like, is represented in Cluster 232 in terms defined by P&R 231. In some exemplary embodiments each parcel under inspected may be represented by a cluster, such as Cluster 232, wherein each cluster may be assigned with cluster identification (ID). Additionally or alternatively information the information comprised in each cluster may be the base for predicting the customs class of the parcel.

In some exemplary embodiments, CCI 233 may be a table indicating a customs classification for each possible combination of parameters and attributes, which are denoted in the P&R 231. Another way of looking at it is, that, in essence each combination represents a possible cluster or a plurality of possible clusters having equivalent parameters and attributes. Thus should have identical customs classification. In some exemplary embodiments, a table, such as CCI 233, may initially put together manually based on state regulations and prior knowledge and of customs officials. However, CCI 233 may be a dynamic table which is constantly updated by prediction (to be described later) of new coming clusters and new validations (to be described later).

In some exemplary embodiments, ICS 200 may comprise Local Database 240. Local Database 240 may a local data repository retaining parameters and attributes, clusters, predicted customs classifications, a combination thereof, or the like. Local Database 240 may be the source from which ICS 200 may retrieve relevant P&R 231, clusters, and CCI 233 to conduct its ongoing calculations. Local Database 240 may retain past clusters, past predicted customs classifications as well as old and new parameters & attributes. In some exemplary embodiments Local Database 240 may utilize the Internet connection for sharing its data with other customs entities, backup and update information by using a cloud repository.

Figure 3:
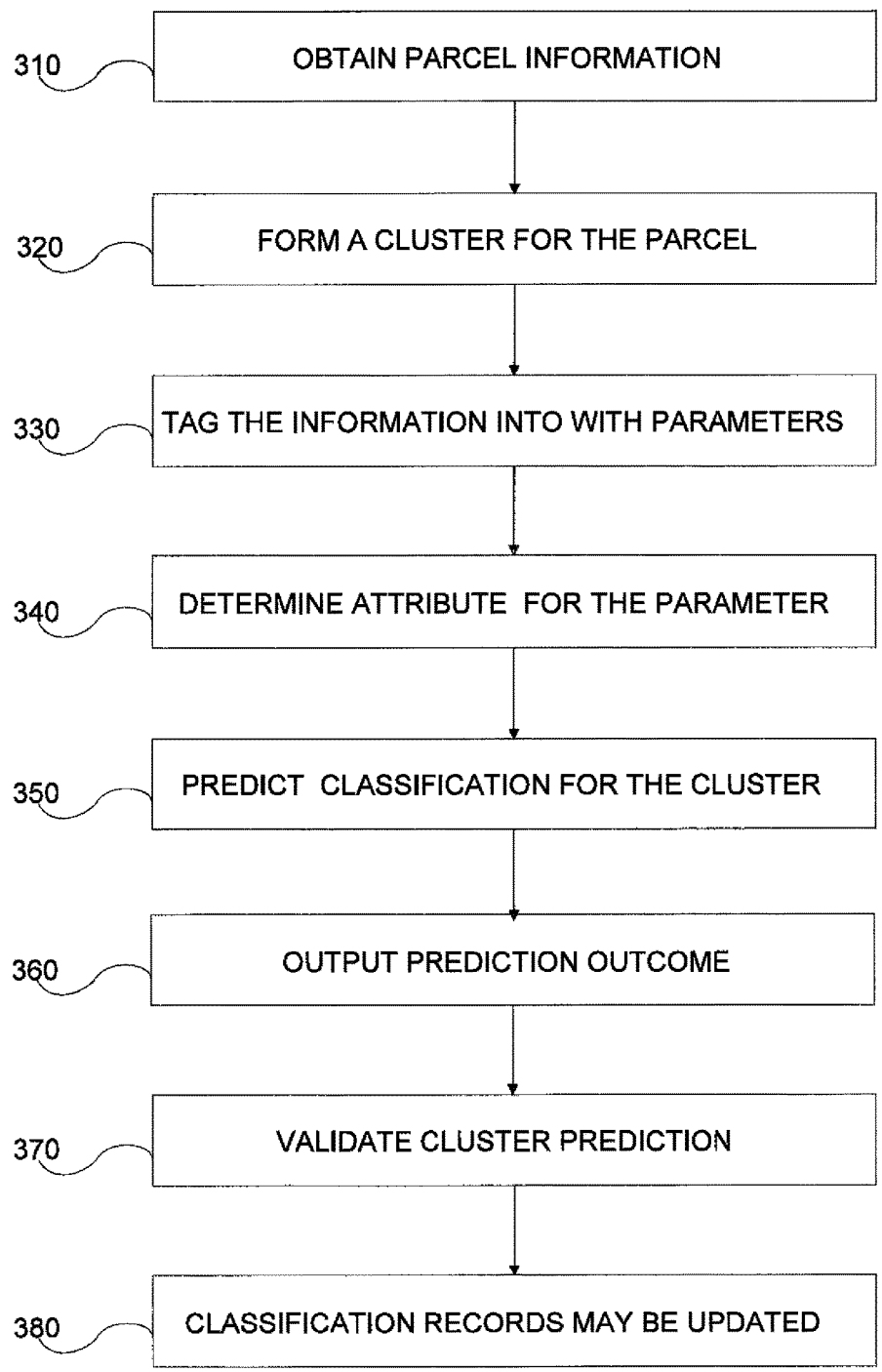
FIG. 3 shows a flowchart diagram of a method for customs classification, in accordance with some exemplary embodiments of the disclosed subject matter.

Referring now to FIG. 3 showing a flowchart diagram of a method in accordance with some exemplary embodiments of the disclosed subject matter.

In step 310, parcel's information may be obtained from a data acquisition system, such as System 100 shown in FIG. 1. In some exemplary embodiments, the parcel's information may comprise digital representation of a recipient address, a sender address, weight of goods packed in the parcel, gross weight of the parcel, cost of goods packed in the parcel, quantity of goods in the parcel, parcel's origin country courier company ID, insurance broker ID, description of goods, a combination thereof, or the like. In some exemplary embodiments, System 100 shown in FIG. 1 may be utilized for automatically obtaining the parcel's information, as well as processing it into digital representation and communicate it to processor 210 shown in FIG. 2. Additionally or alternatively a portion of the information may be manually entered to system 200 of FIG. 2 by a customs employee, such as User 221 of FIG. 2.

In step 320, a cluster may be formed. In some exemplary embodiments, forming a cluster comprises recording the parcel's information to Local Database 240, shown in FIG. 2, in a location designated by the cluster ID. In some exemplary embodiments, forming a cluster comprises mapping the parcel's information according to a table, such as P&R 231 shown in FIG. 2. Additionally or alternatively, mapping may comprise tagging entries comprised in the cluster with a substantially matching parameter and determining a substantially matching attribute for the tagged entry (further elaboration below).

In step 330, the parcel's information may be tagged in accordance with parameters. In some exemplary embodiments P&R 231, shown in FIG. 2, may comprise a list of parameters generally associated with the parcel's information. For example, the parcel's information may be titled as value of goods; quantity of goods items; weight of goods; size of goods; type of goods; country of origin, a combination thereof, or the like. The process of tagging may comprise matching a parameter to a parcel's information title.

It should be noted, that in order to form a cluster, at least one information title of a foreign originated parcel may be tagged by a matching parameter. Each sovereign country may define parameters by which their customs authorities may categorize tariffs for customs dues. In some exemplary embodiments, tagging information, such as the information obtained in Step 310, may comprise determining the most appropriate parameter for tagging each information title of the parcel's information. Additionally or alternatively, Step 330 may be completed after a sufficient amount of the parcel's information titles of the cluster are tagged with parameters. In the embodiments, where the amount of tagged parameters is insufficient, the parcel may be routed for manual inspection or detention. Sufficient amount of tagged parameters may be a factor defining the minimum number of parameters required for predicting the customs classification. In some exemplary embodiments raw information titles lacking a matching title may be disregarded, manually matched by a user, or the like.

In step 340, an attribute for each parameter of the cluster may be determined. In some exemplary embodiments, each parameter may be assign with at least one attribute that represents a calculated value of the parameter. The attribute may be determined by extracting an initial value of the parameter from the parcel's information. In addition, an algorithm, such as successive approximation, or the like, may be utilized to select; from a parameter & attribute table, such as P&R 231; a substantially appropriate attribute for the parameter.

It should be noted that, the process of structuring a cluster may be completed after concluding Steps 320, 330 and 340, as well as storing the cluster in Local Database 240. In some exemplary embodiments, a cluster, such as Cluster 232 shown in FIG. 2, may be considered as, a cluster under inspection. It is also should be noted that clusters of past inspections are stored in section, called "big-data" (not shown), of the Local Database 240. Each cluster of the plurality of clusters included in the big-data section may comprise a classification record.

In step 350, customs classification of a cluster may be predicted. In some exemplary embodiments, the cluster representing a parcel under inspection may be retrieved from Local Database 240 and registered as Cluster 232 in Memory Unit 230, all shown in FIG. 2. Afterwards, a data mining algorithm, machine learning algorithm, a combination thereof, or the like, may be utilized to predict the customs classification of Cluster 232 (i.e. the parcel under inspection).

In some exemplary embodiments, customs classification process comprises determining if customs dues do not apply in respect of the parcel; the parcel should be routed for manual inspection; the parcel should be routed for detention; customs dues applies in respect of the parcel and the applicable class of dues; a combination thereof, or the like. Additionally or alternatively the determined classification may be registered in the classification record of the cluster representing the parcel under inspection.

In some exemplary embodiments, utilizing data mining algorithm may comprise conducting analytic process, configured to explore clusters stored in the big-data section of Local Database 240, in search of consistent patterns and systematic relationships with variables of Cluster 232. This process may include more exploratory methods, such as identifying similar clusters by "drilling-down" to their parameters and attributes. It is appreciated that similar clusters (i.e. clusters having consistent patterns and systematic relationships between their variables) may also have similar classification record. Thus, after the data mining algorithm identifies a cluster similar to Cluster 232 it may assume the classification record of the similar cluster.

In step 360, an outcome of the prediction may be outputted. In some exemplary embodiments, the outcome may be a predicted customs classification of the cluster, wherein the outcome represents the customs classification of the parcel under inspection, Additionally or alternatively the outcome may be communicated to a user, such as user 221 shown in FIG. 2; printed on the parcel (printer not shown); registered in the data repository; mailed to the addressee of the parcel, a combination thereof, or the like.

In some exemplary embodiments of the disclosed subject matter, a routine inspection process conducted by ICS 200, shown in FIG. 2, may be terminated after Step 360. The routine inspection process may be repeated for each parcel, that is to say that Steps, 310 through 360, are repeated for each parcel without any human intervention.

In step 370, a cluster prediction may be validated. In some exemplary embodiments, the routine inspection process may be interrupted for validating the prediction process. Customs personnel may conduct the validation, by executing a manual inspection. The validation comprises comparing the ICS 200 results that are registered in the classification record of Cluster 232 with respect to the manual inspection results. In some exemplary embodiments, the validation may be conducted periodically, such as once a week, once a month, a combination thereof, or the like. Additionally or alternatively, the validation may be conducted upon counting a certain amount of 'routine inspections' since the last validation, for example 5,000 parcels, 10,000 parcels, or the like. In some exemplary embodiments, the inspection process may be interrupted for validating the prediction, automatically by ICS 200, arbitrarily by customs officer, a combination thereof, or the like.

In step 380, classification record may be updated. In some exemplary embodiments, the ICS 200 results, which are registered in the classification record of Cluster 232, do not comply with the manual inspection results. In such case, the classification record of Cluster 232 and all the similar clusters, stored in the big-data, may be updated to agree with the manual inspections results.

It should be noted that, the prediction quality of the system, presented in this disclosed subject matter, may be proportional to the size of the big-data. In another words, statistical study, of the present disclosure system, shows that increasing the amount of clusters in the big-data improves the prediction quality. In some exemplary embodiments, the longer the ICS 200 have been operated the more accurate it become. In addition the frequency of interrupts for validation may be reduced as the big-data grows.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, python, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Optionally, an ICR (intelligent character recognition) sensor can be used instead of the OCR mentioned herein before or in combination with the OCR.

I claim:

1. An inspection and classification system having a customs data repository for automatic customs inspection of parcels, the system comprising:
  a data acquisition module configured to acquire information about a parcel by a plurality of input devices selected from the group consisting of an optical character recognition (OCR) scanner, an intelligent character recognition (ICR) scanner, and a combination thereof, wherein the information about the parcel is indicative of criteria's for customs classification of the parcel,
  wherein said data acquisition module is further configured to communicate the information about the parcel to said customs data repository;
  wherein said customs data repository is configured to store data selected from the group comprising of: the information about a plurality of parcels; parameters tables; attributes tables; and big-data;
  a processor coupled with memory configured to map the information about a parcel according to the parameters and attributes tables, wherein a representation of the mapped information about the parcel is a cluster, wherein the processor is coupled with memory comprising:
  a customs classification index utilized for indicating the customs classification of a comparable cluster stored in the big-data, wherein each cluster stored in the big-data is characterized by a combination of its parameters and attributes; and
  a machine learning algorithm configured for manipulating said big-data;
  and
  wherein said processor is further configured for predicting a customs classification of the parcel based on a comparison between the parameters and attributes of the cluster and parameters and attributes of clusters stored in said big-data, wherein the clusters stored in said big-data are clusters of previously inspected parcels, and
  wherein the cluster assumes a customs classification of a comparable cluster stored in the big-data.

2. The system of claim 1, wherein said data acquisition module further comprising: selective control of each input device of the plurality of input devices; and interfaces for receiving acquired information from the plurality of input devices.

3. The system of claim 2, wherein an input device of the plurality of input devices is a barcode reader, configured to acquire digital representation of information about the parcel.

4. The system of claim 2, wherein an input device of the plurality of input devices is a scale sensor, configured to measure weight of the parcel.

5. The system of claim 2, wherein an input device of the plurality of input devices is a geometry sensor, configured to acquire dimensions of the parcel.

6. The system of claim 2, wherein the OCR scanner or the ICR scanner is configured to acquire information selected from the group comprising of: handwritten characters; typed characters; symbols; icons; stamps and postage stamps from the parcel.

7. The system of claim 2, wherein the plurality of input devices acquire information about the parcel while the parcel is conveyed by a conveyor.

8. A data acquisition system for automatic customs inspection of parcels comprising:
  a data acquisition module configured to acquire information about a plurality of parcels by a plurality of input devices selected from the group consisting of an optical character recognition (OCR) scanner, an intelligent character recognition (ICR) scanner, and a combination thereof, wherein the information of each parcel of the plurality of parcels is indicative of criteria's for customs classification of the each parcel,
  wherein said data acquisition module is further configured to selectively control each input device of the plurality of input devices,
  wherein said data acquisition module is further configured to communicate the information about the plurality of parcels,
  wherein the plurality of input devices are configured to acquire information in parallel and independent of each other,
  wherein the plurality of input devices are configured to transmit acquired information to said data acquisition module, and
  wherein a processor is coupled with memory comprising:

a customs classification index utilized for indicating the customs classification of a comparable cluster stored in the big-data, wherein each cluster stored in the big-data is characterized by a combination of its parameters and attributes; and a machine learning algorithm configured for manipulating said big-data.

9. The system of claim 8, wherein an input device of the plurality of input devices is a barcode reader, configured to acquire digital representation of information about a parcel of the plurality of parcels.

10. The system of claim 8, wherein an input device of the plurality of input devices is a scale sensor, configured to measure weight of a parcel of the plurality of parcels.

11. The system of claim 8, wherein an input device of the plurality of input devices is a geometry sensor, configured to acquire dimensions of a parcel of the plurality of parcels.

12. The system of claim 8, wherein an input device of the plurality of input devices is an optical character recognition (OCR) scanner configured to acquire information selected from the group consisting of handwritten characters; typed characters; symbols; icons; stamps and postage stamps from a parcel of the plurality of parcels.

13. The system of claim 8, wherein the plurality of input devices acquire information about a parcel of the plurality of parcels while the parcel is conveyed by a conveyor.

14. A method for automatic inspection and classification of parcels through customs, wherein the parcels are selected from the group consisting of boxes, packages, and large envelopes, the method comprising:

obtaining information about a parcel under inspection by a plurality of input device devices selected from the group consisting of an optical character recognition (OCR) scanner, an intelligent character recognition (ICR) scanner, and a combination thereof;

forming a cluster for the parcel under inspection, wherein the cluster is a record characterized by a combination of parameters and attributes based on said information about the parcel under inspection, wherein the data representation comprises a plurality of entries, and forming a cluster further comprising:

retaining the inspected clusters in a big-data repository;

obtaining a customs classification index list for indicating the customs classification of a comparable cluster stored in the big-data according to the clusters parameters and attributes values;

tagging at least one entry of the plurality of entries with a matching parameter value; and determining, by a processor, a matching attribute value for each entry of the cluster that is tagged with a matching parameter;

predicting, by a machine learning algorithm, a customs classification of the cluster, wherein said predicting further comprising indicating the cluster as an inspected cluster;

outputting an outcome of said predicting of the cluster, wherein the outcome represents a customs classification of the parcel under inspection;

validating an outcome, wherein the validating an outcome comprises a maintenance procedure of comparing a said predicting outcome with outcome of manually performed inspection, wherein the maintenance procedure occurs periodically; and wherein said validating further comprises updating customs classification of clusters indicated as inspected cluster and having comparable parameters and attributes.

15. The method of claim 14, wherein said obtaining is utilizing a data acquisition module for acquiring the information about a parcel under inspection from a plurality of input devices.

16. The method of claim 14, wherein said tagging is utilizing a successive approximation calculation to determine a substantially nearest matching parameter for an entry.

17. The method of claim 14, wherein said determining is utilizing successive approximation calculation to determine a substantially nearest matching attribute for an entry tagged with a parameter.

18. The method of claim 14, wherein said predicting is utilizing a machine learning algorithm to determine customs calcification of parcels based on analytical study of the inspected clusters retained in a big-data repository.

19. The method of claim 14, wherein said predicting is utilizing a data mining algorithm to determine customs calcification of parcels by drilling down to parameters and attributes of the inspected clusters retained in a big-data repository.

* * * * *